Feb. 25, 1936.  R. O. CHAFFEE  2,032,315
ROTARY OPERATIVE FASTENER INSTALLATION AND FASTENER FOR THE SAME
Filed June 13, 1933
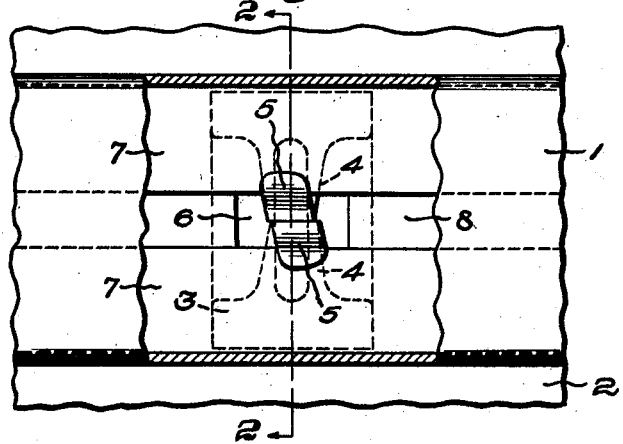
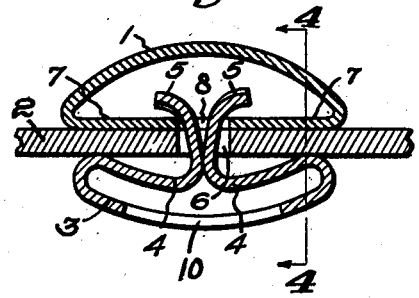
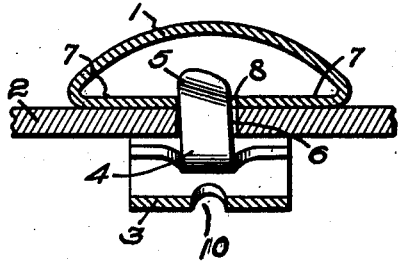
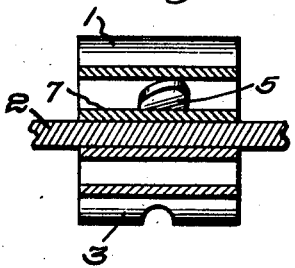
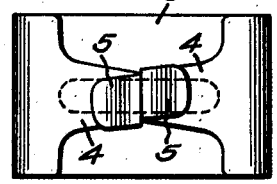
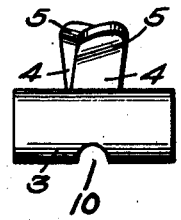
Inventor:
Raymond O. Chaffee,
by Walter S. Jones
Atty.

Patented Feb. 25, 1936

2,032,315

UNITED STATES PATENT OFFICE 2,032,315

ROTARY OPERATIVE FASTENER INSTALLATION AND FASTENER FOR THE SAME

Raymond O. Chaffee, Belmont, Mass., assignor to United-Carr Fastener Corporation, Cambridge, Mass., a corporation of Massachusetts Application June 13, 1933, Serial No. 675,586

3 Claims. (Cl. 85—5)

My invention aims to provide improvements in fastener secured installations and fasteners of the rotary operative type.

In the drawing which illustrates a preferred embodiment of my invention:—

Figure 1 is a plan view, partly in section, of a portion of an installation showing the manner of securing a hollow molding in position by my improved fastening members;

Fig. 2 is a section taken on the line 2—2 of Fig. 1 showing the fastener in locking position;

Fig. 3 is a section similar to that shown in Fig. 2, but showing the fastener before being turned to locking position;

Fig. 4 is a section taken on the line 4—4 of Fig. 2 to show the angle of the end of the hook in relation to the other parts;

Fig. 5 is an under side plan view of the fastener member; and

Fig. 6 is an end view of the fastener member shown in the other figures.

My invention, as illustrated by the drawing, is particularly, though not exclusively, adapted for use in attaching moldings and the like to a sheet metal structure and includes a simple efficient one-piece sheet metal fastener for accomplishing the desired result. It should be understood that the fastening member is complete in and of itself and may be used to secure together two or more relatively thin apertured members without the use of additional screws or the like.

Referring to the specific embodiment of my invention illustrated by the drawing, I have shown a sheet metal fastener constructed from a single piece of metal and used to secure a hollow molding strip 1 to a thin sheet metal structure 2.

The fastening member is formed from a flat strip of metal and comprises a body portion 3 and a pair of yieldable fingers 4 having hook-like end portions 5. The fingers are narrower than the body and extend inwardly toward each other from adjacent to opposite edges of the body portion 3 and then upwardly and outwardly away from the body portion, as best illustrated in Fig. 2. It should be noted that the hook portions of the fingers present straight surfaces crosswise for substantial engagement with the straight surfaces provided by the inner edges of the flanges 7—7 of the molding 1 and also that the ends are inclined (Figs. 3 and 4) for the purposes hereinafter described. The fingers 4—4 are brought into contact for at least a portion of their lengths which extend through the parts 1 and 2 to prevent the ends from being moved toward each other a sufficient distance to allow the fastener to be withdrawn when in locked position.

The aperture 6 may be oblong (Fig. 1), or any other desirable shape, so long as it will permit the hook portions 5—5 to pass therethrough when the fastener is in the position shown in Fig. 3.

Assuming that the parts desired to be secured together are as shown in the drawing, the fastener may be attached by entering the fingers through the aperture 6 and the space 8 between the inner edges of the flanges 7—7. Then the fastener may be rotated by the use of a tool such, for instance, as a screw driver (not shown) which fits into a tool-receiving slot 10 formed lengthwise of the body portion 3 of the fastener. Upon rotation of the fastener from a position shown in Fig. 3 to a position shown in Fig. 2 the sloping surfaces will engage the flanges very readily and then act as cams to draw the parts together. This in effect gives a screw tightening action. During the turning operation the hook portions must be forced toward each other to overcome the difference in the distance between the corners of the opposed hook portions and the distance between the edges of the flanges 7—7 so that the fastener may be turned into a position shown in Figs. 1 and 2. Thus there is provided a sort of a snap action so that when the fastener is turned to its ultimate locking position the straight faces of the hook portions will engage the straight faces of the inner edges of the flanges 7—7. It will, of course, be understood by those skilled in the art that such engagement, plus a certain amount of tension supplied by the formation of the curved fingers beneath the body portion, the abutment of the fingers and hook portions thereof, will securely hold the fastener in locking position so that it cannot accidentally be turned to the unlocking position or withdrawn by a straight pull.

It will be noted that I have shown the body portion 3 as being somewhat curved longitudinally and that the inwardly extending portions of the fingers 4 normally parallel the curvature of the body portion 3. This construction permits relative yielding of the fingers toward and away from the base portion. For instance, an observation of Fig. 2 will clearly show that the fingers 4 may yield both throughout their lengths and adjacent to their connections with the body portion 3 to compensate for variations in thickness of the flange 7 and the structure 2. With this construction I can manufacture my simple fastening devices for securing together two members of minimum thickness and use the same fastening members to secure together other members of substantially increased thickness.

The fastening members are constructed in such a manner that they are exceedingly durable and are sufficiently stiff in action so that it requires considerable turning power to move the fastener into either locking or unlocking position. As a result the members 1 and 2 are held tightly against one another so that they cannot shift without exerting considerable force on one part or the other. Furthermore, there is a definite snap action which takes place during the rotation of the fastener relative to the parts to be secured together both in the locking and the unlocking movements so that the operator can know exactly when the fastener is in either locked or unlocked position.

I am aware of the fact that I am not the inventor of the broad ideas disclosed, both as to the fastener and the installation. However, I have made several improvements which are highly desirable and serve useful purposes so that my improved fastener and installation have decided advantages and produce results not heretofore produced by any device of which I am aware.

While I have illustrated and described a preferred embodiment of my invention, I do not wish to be limited thereby, because the scope of my invention is best defined by the following claims.

I claim:

1. The combination with a pair of relatively thin superposed apertured members of a rotary operating fastener member, said fastener member having a body portion located at one side of one of said apertured members, and yieldable fingers located beneath said body portion and securing said members together, said fingers extending toward each other from adjacent to an edge of said body portion inwardly beneath and spaced from it except where they join the body portion and then through the apertures in said apertured members in contact with each other and then outwardly from each other and engaging and overlying one member and being yieldable as a whole relative to the body portion and throughout their lengths to adjust the fastener member to various thicknesses of apertured members and the ends of said hook-like members being twisted to present angled surfaces extending generally transverse to the axis of the apertures through said superposed members to engage the last mentioned apertured member and clamp the apertured members tightly between said hook-like members and those portions of the yieldable fingers resting against the first mentioned apertured member.

2. A fastener member of the class described formed from a single piece of sheet metal and having a body portion and yieldable finger portions located beneath said body portion, said finger portions extending toward each other from adjacent to opposite edges of said body portion inwardly beneath and spaced from it and into contact with each other and having their ends flaring outwardly from each other to provide hooks for securing two or more relatively thin parts together, said hook portions presenting relatively wide straight engaging surfaces crosswise thereof for interlocking engagement with cooperating surfaces of at least one of the parts to be secured together and also having their ends slightly twisted, and said finger portions being substantially narrower than the body portion, the contact of the finger portions serving to prevent the ends thereof from moving toward each other a sufficient distance to allow the fastener to be withdrawn when in locked position.

3. The combination with a pair of relatively thin superposed apertured members of a rotary operating sheet metal fastener member, said fastener member having a body portion located at one side of one of said apertured members, and yieldable finger members located beneath said body portion and securing said members together, said fingers being located directly opposite each other and extending toward each other from adjacent to an edge of said body portion inwardly beneath and spaced from it except where they join the body portion, and then through the apertures in said apertured members and being face to face in contact with each other and then extending outwardly from each other to form hook-like portions engaging and overlying one of said apertured members the intermediate bent portions of said opposed fingers being in contact with each other to prevent the ends thereof from moving toward each other a sufficient distance to allow the fastener to be withdrawn when in locked position, said finger members together with said hook-like portions being yieldable as a whole relative to the body portion and throughout their lengths to adjust the fastener member to various thicknesses of apertured members.

RAYMOND O. CHAFFEE.